United States Patent [19]

Mabuchi

[11] Patent Number: 4,574,215

[45] **Date of Patent: * Mar. 4, 1986**

[54] BRUSHGEAR FOR MINIATURE MOTORS

[75] Inventor: Takaichi Mabuchi, Matsudo, Japan

[73] Assignee: Mabuchi Motor Co., Ltd., Japan

[ * ] Notice: The portion of the term of this patent subsequent to Jan. 15, 2001 has been disclaimed.

[21] Appl. No.: 523,429

[22] Filed: Aug. 16, 1983

[30] Foreign Application Priority Data

Aug. 20, 1982 [JP] Japan .......................... 57-125733[U]

[51] Int. Cl.⁴ .......................................... H02K 13/00

[52] U.S. Cl. ................................ 310/239; 310/242; 310/248

[58] Field of Search ............... 310/229, 239, 242, 244, 310/245, 246, 247, 248, 249, 42, 71

[56] References Cited

U.S. PATENT DOCUMENTS

| | | | |
|---|---|---|---|
| 3,234,420 | 2/1966 | Lindner | 310/248 |
| 3,296,473 | 1/1967 | Mabuchi | 310/239 |
| 4,155,023 | 5/1979 | Hagenlocher | 310/246 |
| 4,195,242 | 3/1980 | Mabuchi | 310/242 |
| 4,254,353 | 3/1981 | Matsuda | 310/239 |

FOREIGN PATENT DOCUMENTS

| | | | |
|---|---|---|---|
| 2330680 | 1/1975 | Fed. Rep. of Germany | 310/239 |
| 007214 | 4/1970 | Japan | 310/239 |
| 007215 | 4/1970 | Japan | 310/239 |
| 0108203 | 8/1979 | Japan | 310/239 |

*Primary Examiner*—R. Skudy
*Attorney, Agent, or Firm*—McGlew and Tuttle

[57] ABSTRACT

Brushgear having L-shaped brush arms, each consisting of a terminal strip and a commutator contactor strip, both being joined into one piece by lapping one on another and crimping a plurality of projections formed on the terminal or commutator contactor strip. The terminal and commutator contactor strips are made of materials suitable for each thereof. The brush arms are inserted into the grooves of brush holders provided on a case cover of a motor case and firmly held in position.

16 Claims, 10 Drawing Figures

BRUSHGEAR FOR MINIATURE MOTORS

BACKGROUND OF THE INVENTION

1. Field of the Invention

This invention relates generally to brushgear for miniature motors, and more specifically to brushgear for miniature motors comprising brush arms, each constituting of a terminal strip and a commutator contactor strip for making electrical contact with a motor commutator by means of a brush mounted thereon, both being joined into one piece; the brush arms being held in position by inserting them into grooves provided on a case cover of a motor case; and arrangements being made to allow the terminal and commutator contactor strips of the brush arms to be made of desired metals and the brush arms to be firmly held in position.

2. Description of the Prior Art

The performances (for example, torque) of a DC motor changes with changes in the contact pressure of brushes against the commutator (hereinafter referred to as brush pressure). It is necessary, therefore, to obtain a motor having uniform performances by selecting the brush pressure so that the motor can be run in the optimum state and preventing the brush pressure from fluctuating. Particularly, in a miniature motor whose brush pressure is determined by the resiliency of the brushes thereof made of metal strips, as shown in FIG. 1, holding the brush arms securely in position is of critical importance.

The present inventor has proposed brushgear where brush arms are securely held in position (Japanese Utility Model Publication No. 7214/1970, and Japanese Utility Model Publication No. 7215/1970). FIG. 1 shows a crosssectional view of a miniature motor using the brushgear of the above-mentioned conventional invention. FIGS. 2 through 4 are diagrams of assistance in explaining the brushgear of the conventional invention. In the following, the brushgear of the conventional invention will be briefly described referring to FIGS. 1 through 4.

In FIG. 1, reference numeral 1 refers to a motor case; 2 to a case cover made of synthetic resin; 3 to a permanent magnet; 4 to a rotor; 5 to a rotating shaft; 6 to a commutator; 7 to brush arms; 8 to a brush holder, respectively. FIG. 2 is a right-hand side view of the case cover 2 having thereon and brushgear shown in FIG. 1. Reference numerals 2 and 6 through 8 correspond with like numerals in FIG. 1. 9 indicates a terminal strip; 10 to a commutator contactor strip; both the terminal and commutator contactor strips being bent to a substantially L-shape to form a brush arm 7. On a free end of the commutator contactor strip 10 mounted is a brush 11 made of carbon or a suitable material for making electrical contact with a commutator 6. As shown in FIG. 3A, the brush arm 7 has a bead 12 formed by embossing inward the L-shaped bent portion thereof. As shown in FIG. 3B, which is a crosssectional view taken along line A—A′ in FIG. 3A, the bead 12 has a circular-arc shaped crosssection. On the brush holder 8 on the case cover 2, provided is a groove for retaining a brush arm 7 in position to bring the brush 11 in electrical contact with the commutator 6 and leading out the terminal strip 9 for external connection, as shown in FIG. 4. The groove 13 has a shape corresponding with the L-shape of the brush arm 7, as shown in FIG. 2, and the width W of the groove 13 (as shown in FIG. 4) is made slightly smaller than the height H of the bead 12 (as shown in FIG. 3B). By inserting the bead 12 in the groove 13, the brush arm 7 is securely held in position, whereby the brush 11 makes electrical contact with the commutator 6 at a stable pressure by the resiliency of the commutator contactor strip 10.

In the foregoing, the conventional type of brushgear invented by the present inventor has been described in reference to FIGS. 1 through 4. The brush arm 7 in brushgear is usually made of phosphor bronze, beryllium bronze, etc. having good electrical conductivity and high resiliency. Phosphor bronze or beryllium bronze as used for this type of brush arm 7 is suitable as a material for the commutator contactor strip 10 requiring resiliency, but not desirable as a materials for the terminal strip 9 because of brittleness or the difficulty in soldering. As a material for terminals, a flexible and electrically conductive material, such as copper or brass, is generally desirable to ensure the ease of soldering and the resistance to repeated bending. For this reason, it is conceived to use materials suitable for each of the terminal strip 9 and the commutator contactor strip 10 of the brush arm 7 and join both into an integral structure by various measures, for example, joining both (i) by upsetting rivets, or (ii) by spot welding.

The joining method as described in (i), however, is not desirable due to increases in the number of required parts and the number of manufacturing steps. The joining method of (ii), on the other hand, involves the difficulty in spot welding phosphor bronze or berylium bronze with copper or brass.

SUMMARY OF THE INVENTION

It is an object of this invention to provide brushgear for miniature motors wherein the terminal and commutator contactor strips thereof are made of desired metals.

It is another object of this invention to provide brushgear for miniature motors wherein the terminal and commutator contactor strips thereof are easily joined into one piece.

It is a further object of this invention to provide brushgear for miniature motors wherein the brush arms thereof are securely held in position.

It is a further object to provide brushgear for miniature motors which contributes to improvement of motor performance and ensures uniform performance.

The brushgear for miniature motors according to this invention is characterized in that the brushgear comprises brush arms, each having a terminal strip made of a flexible and electrically conductive metal strip forming a terminal portion being led out for external connection and a commutator contactor strip made of a highly resilient electrically conductive metal strip forming a commutator contactor portion and including a brush for making electrical contact with a commutator and integrally formed with the thermal strip, and a brush arm supporting means provided on a case cover of the motor case.

Other objects and features of this invention will become apparent from the following description taken in conjunction with the accompanying drawings.

DETAILED DESCRIPTION OF THE INVENTION

Figure 1:
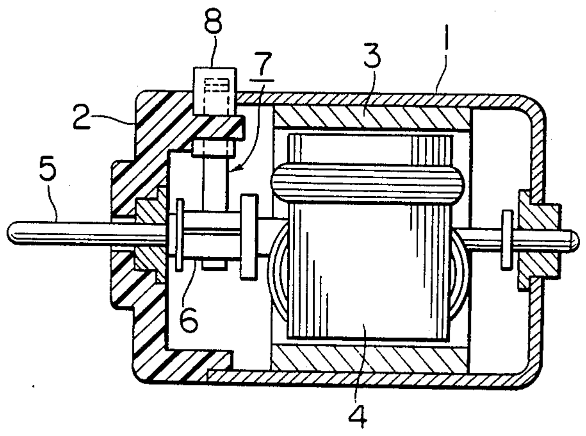
FIG. 1 (PRIOR ART)
FIG. 1 is a crosssectional view of a miniature motor to which brushgear of the conventional type is applied.
Figure 2:
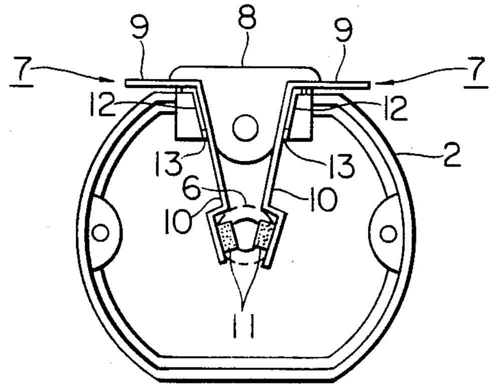
FIG. 2 (PRIOR ART)
FIG. 2 is a right-hand side view of a case cover of the miniature motor to which brushgear of the conventional type is applied shown in FIG. 1.
Figure 3A:
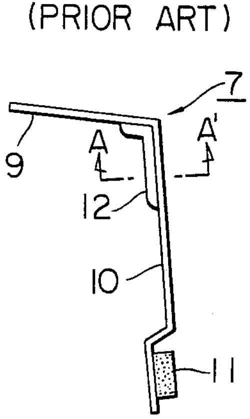
FIG. 3A (PRIOR ART)
FIG. 3A is a side view of a brush arm of the conventional brushgear.
Figure 3B:
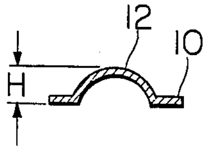
FIG. 3B (PRIOR ART)
FIG. 3B is a crosssectional view taken along line A—A' in FIG. 3A.
Figure 4:
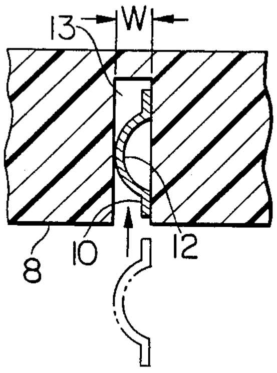
FIG. 4 (PRIOR ART)
FIG. 4 is a crosssectional view illustrating the state where the brush arm shown in FIGS. 3A and 3B is inserted in a groove of the conventional brushgear.
Figure 5:
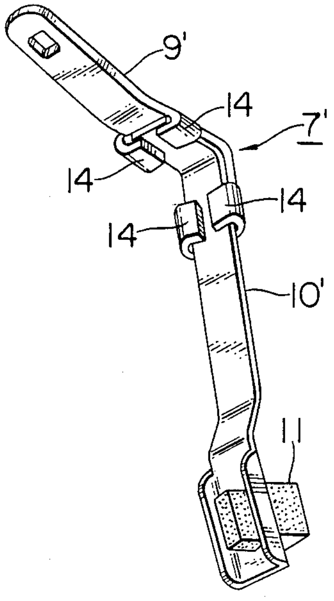
FIG. 5 is a perspective view of a brush arm used in this invention.
Figure 6:
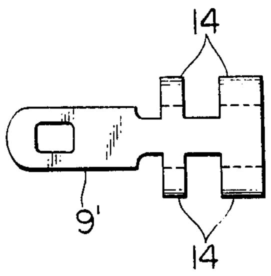
FIG. 6 is a plan view illustrating the state of the terminal strip in the embodiment shown in FIG. 5 before joining.

A brush arm 7' used in this invention has a terminal strip 9' forming a brush arm 7' and a commutator contactor strip 10' each made of desired conductive metals, for example a copper or brass strip for the terminal strip 9' and a highly resilient phosphor bronze or beryllium bronze strip for the commutator contactor strip 10, as shown in FIG. 5. The terminal strip 9' and the commutator contactor strip 10' are lapped and joined into one piece by bending and crimping four projections 14 provided on the terminal strip or the commutator contactor strip 10'. FIG. 5 shows a brush arm embodying this invention wherein the projections 14 are provided on the terminal strip 9', and the commutator contactor strip 10' is lapped on the terminal strip 9' and joined with the terminal strip 9' by bending and crimping the projections 14. Though not shown in the figure, the projections 14 may be provided on the commutator contactor strip 10' for crimping the terminal strip 9'. Strip 10' carries a brush 11 for engaging the commutator (shown in FIG. 1 for example).

Figure 7A:
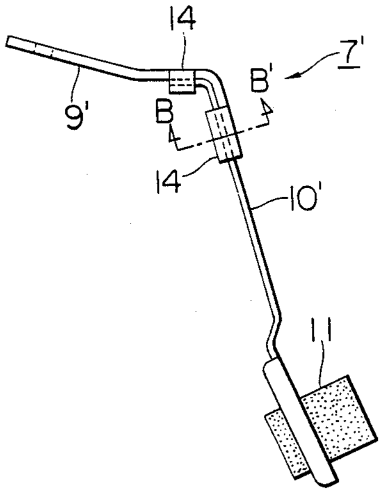
FIG. 7A is a side view of the embodiment shown in FIG. 5.

The brush arm 7' formed by mechanically joining the terminal strip 9' and the commutator contactor strip 10' into one piece by bending and crimping the projections 14 is bent into an L-shape, as shown in FIG. 7A. The abrasion between the terminal strip 9' and the commutator contactor strip 10' caused by bending allows electrical contact resistance between the terminal strip 9' and the commutator contactor strip 10' to be reduced.

Figure 7B:
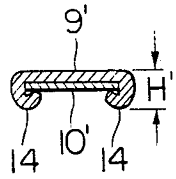
FIG. 7B is a crosssectional view taken along line B—B' shown in FIG. 7A.
Figure 8:
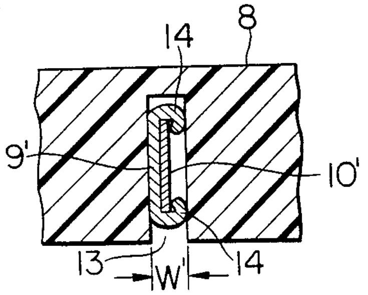
FIG. 8 is a diagram of assistance in explaining the state where the brush arm of this invention is held in position.

As described above, the supporting means of the brush arm 7' of this invention which is bent into an L-shape is essentially the same as with the conventional brushgear as described in reference to FIGS. 1 through 4. That is, a groove of a shape corresponding to the L-shape of the brush arm 7' of this invention is provided on a brush holder 8 on a case cover 2 of the motor case of the miniature motor to which the brushgear of this invention is applied. The holder 8 thus forms brush supporting means for the brush arm 7'. The width W' of the groove 13 (as shown in FIG. 8) is made slightly smaller than the thickness H' of the crimped portion of the brush arm 7' of this invention, that is, the bent portion of the projection 14 shown in FIG. 7B. Consequently, by inserting the brush arm 7' into the groove 13, the brush arm 7' is firmly held in the brush holder 8 at the corners of the projection 14, as shown in FIG. 8.

Next, an example of design data for the embodiment shown in FIG. 5 is shown below.

(i) Terminal strip 9'
Material: brass, thickness: 0.2 mm
(ii) Commutator contactor strip 10'
Material: beryllium bronze, thickness: 0.1 mm
(iii) Thickness of bent portion of projection 14 (H in FIG. 7B): 0.55 mm
(iv) Width of groove 13 (W' in FIG. 8): 0.5 mm

What is claimed is:

1. Brushgear for a miniature motor comprising: brush arms each having a terminal strip, made of a flexible and electrically conductive metal strip, forming a terminal portion adapted to extend through a motor case of the motor and adapted for external connection, and a commutator contactor strip, made of a highly resilient and electrically conductive metal strip, forming a commutator contactor portion adapted for making electrical contact with a commutator of the motor by means of a brush mounted on said commutator contactor strip; and brush supporting means provided on a case cover of the motor case for supporting said brush arm; said terminal strip having a plurality of projections formed by extending the strip; said projections being bent and crimped, with said terminal strip and said commutator contactor strip at least partly overlapping, to join said terminal and commutator contactor strip together into one piece at a joint.

2. Brushgear for miniature motors as set forth in claim 1, wherein the brush supporting means has grooves for supporting the brush arms by inserting said joint of said terminal and said commutator contactor strips thereinto.

3. Brushgear as set forth in claim 2 wherein a width of each groove provided on said brush supporting means is made slightly smaller than a thickness of the bent portion of said projections.

4. Brushgear as set forth in claim 3 wherein said terminal strip is made of copper.

5. Brushgear as set forth in claim 3 wherein said commutator contactor strip is made of phosphor bronze.

6. Brushgear as set forth in claim 4 wherein the brush arms are bent into an L-shape and the grooves provided on the brush supporting means are formed into a shape corresponding to the L-shape of the brush arms.

7. Brushgear as set forth in claim 5 wherein the brush arms are bent into an L-shape and the grooves on the brush supporting means are formed into a shape corresponding to the L-shape of the brush arms.

8. Brushgear as set forth in claim 3, wherein said terminal strip is made of brass.

9. Brushgear as set forth in claim 3, wherein said commutator contactor strip is made of beryllium bronze.

10. Brushgear for miniature motor as set forth in claim 1, wherein said terminal strip includes four bent projections.

11. Brushgear as set forth in claim 8, wherein the brush arms are bent into an L-shape and the grooves provided on the brush supporting means are formed into a shape corresponding to the L-shape of the brush arms.

12. Brushgear as set forth in claim 9, wherein the brush arms are bent into an L-shape and the grooves on the brush supporting means are formed into a shape corresponding to the L-shape of the brush arms.

13. In a miniature motor having a case cover, the improvement comprising:

a terminal strip for extending through the case cover to provide an external connection, said terminal strip made of flexible and electrically conductive metal with an end in the case cover having a plurality of projections;

a commutator contactor strip for making electrical contact with a commutator of the motor in the case cover, said contactor strip made of highly resilient and electrically conductive metal and having an end overlapping said end of said terminal strip, said projections of said end of said terminal strip being bent over said end of said contactor strip for joining said terminal strip to said contactor strip in a joint area; and support means provided on said casing cover for supporting said terminal strip and connected contactor strip at said joint area.

14. The improvement of claim 13, wherein said projections of said terminal strip comprise at least two pairs of spaced apart projections bent over said contactor strip at said joint area.

15. The improvement of claim 14, wherein said joint area is L-shaped and has a selected thickness, said support means comprising a groove in said case cover having a width which is slightly less than said selected thickness.

16. The improvement of claim 15, wherein said terminal strip is made of material selected from the group consisting of copper and brass, said contactor strip being made of material chosen from the group consisting of phosphor bronze and beryllium bronze.

* * * * *

UNITED STATES PATENT AND TRADEMARK OFFICE

CERTIFICATE OF CORRECTION

PATENT NO. : 4,574,215
DATED : March 4, 1986
INVENTOR(S) : Takaichi Mabuchi

It is certified that error appears in the above-identified patent and that said Letters Patent is hereby corrected as shown below:

Title page,
Item "[*] Notice", please change the text to read:

-- The portion of the term of this patent subsequent to Aug. 16, 2003 has been disclaimed. --

Signed and Sealed this

Twelfth Day of March, 2002

*Attest:*

JAMES E. ROGAN

*Attesting Officer*

*Director of the United States Patent and Trademark Office*